United States Patent
Irwin

[15] 3,665,827
[45] May 30, 1972

[54] FLASH LAMP ACTUATING STRUCTURE

[72] Inventor: George Irwin, Highland Park, Ill.
[73] Assignee: Imperial Camera Corp., Chicago, Ill.
[22] Filed: Nov. 25, 1970
[21] Appl. No.: 92,568

[52] U.S. Cl. ..................95/11.5 R, 95/11 L, 240/1.3, 431/93
[51] Int. Cl. ......................................G03b 15/04
[58] Field of Search...........95/11.5 R, 11 L; 240/1.3, 37.1; 431/92, 93

[56] References Cited

UNITED STATES PATENTS

| | | | |
|---|---|---|---|
| 3,528,353 | 9/1970 | Colville | 95/11 |
| 3,544,249 | 12/1970 | Michatek | 431/93 |
| 3,544,250 | 12/1970 | Beach | 431/93 |
| 3,576,155 | 4/1971 | Beach | 95/11.5 |
| 3,576,156 | 4/1971 | Michatek | 95/11.5 |

Primary Examiner—Samuel S. Matthews
Assistant Examiner—Robert P. Greiner
Attorney—McDougall, Hersh & Scott

[57] ABSTRACT

A flash lamp actuating structure for a camera having means for holding a length of film, film advancing means, and a shutter means for exposing successive frames of film. The shutter means includes at least one movable plate having an opening for registering with a camera lens opening when the plate is moved during shutter operation. A flash bulb of the type which will operate in response to impact imparted by a spring loaded finger is adapted to flash in the course of film exposure. The spring loaded finger is engaged for impact movement by a push bar which is normally retained against movement. During an initial stage of shutter actuation, a spring means is wound whereby energy is stored in the spring means. A push bar actuating member is adapted to be operated by this spring means, and this operation occurs at a later stage of the shutter actuation when the means for retaining the push bar is moved out of the way. The spring energy is released rapidly whereby the push bar will be driven with sufficient force and speed into engagement with the flash lamp impact finger. The push bar also defines means for engaging the shutter plate whereby the film exposure is dependent upon the movement of the push bar.

11 Claims, 12 Drawing Figures

Patented May 30, 1972

INVENTOR
George Irwin
by McDougall Hersh
and Scott Att'ys

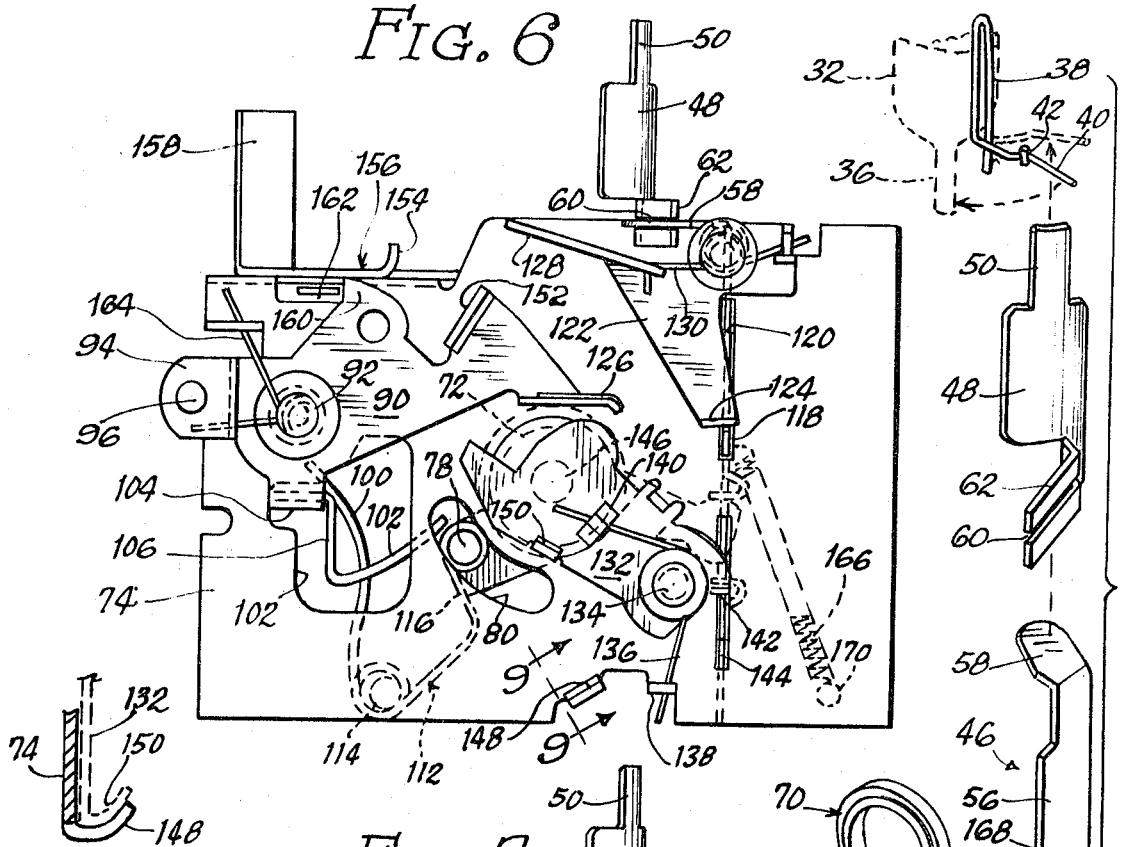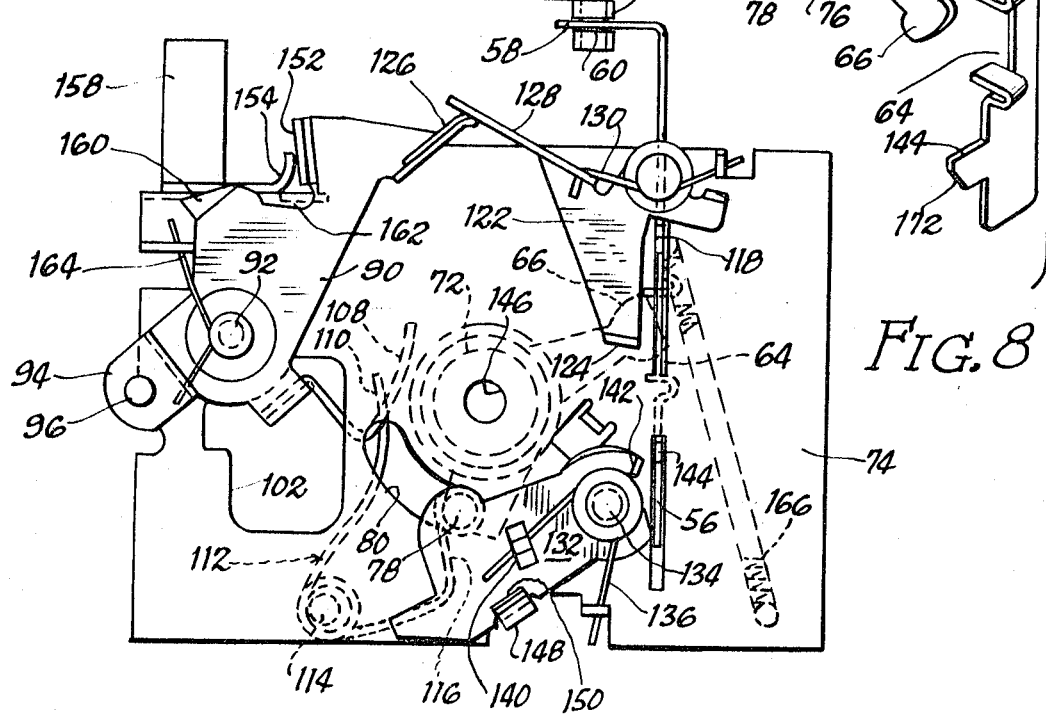

Patented May 30, 1972
3,665,827
3 Sheets-Sheet 3
FIG. 10
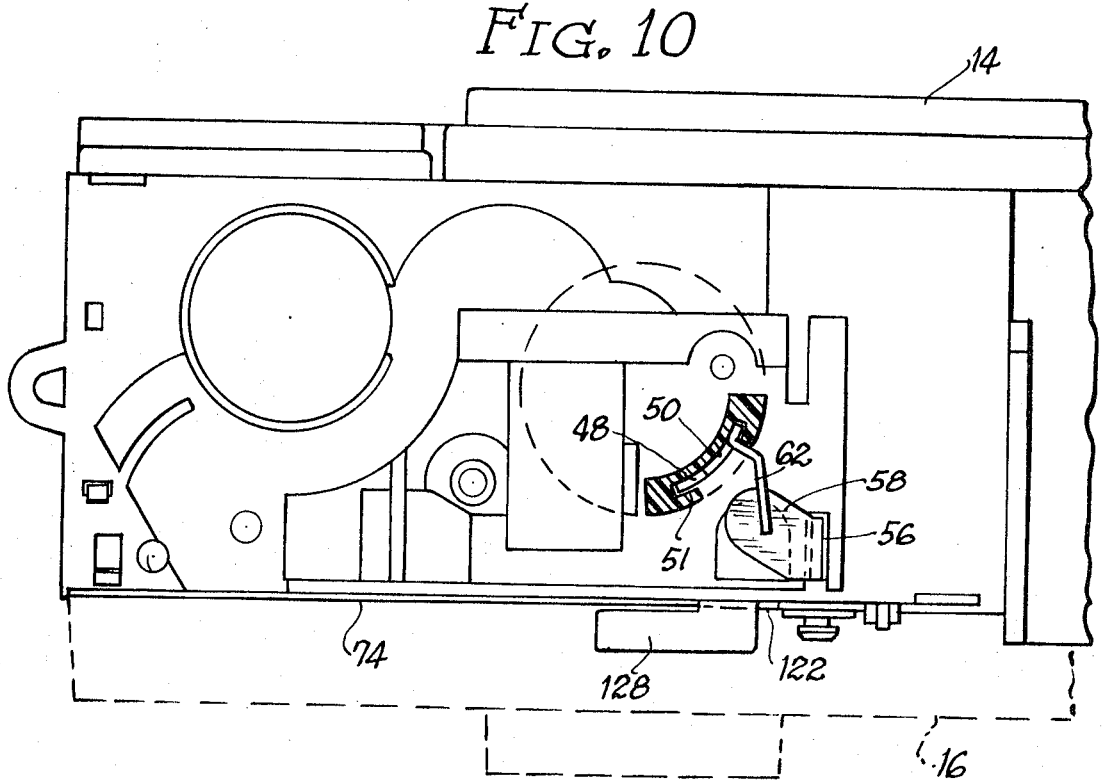
FIG. 11
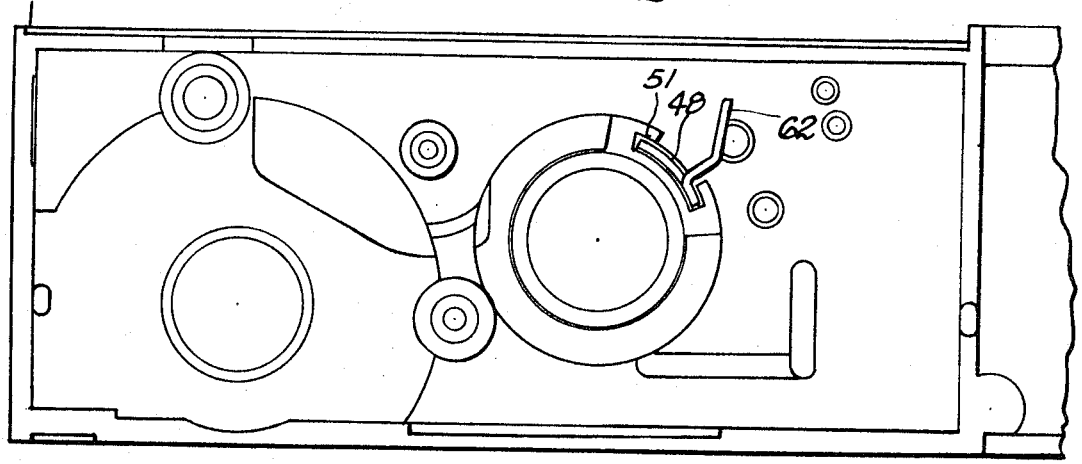
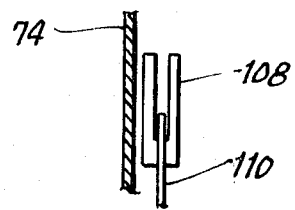
FIG. 12

FLASH LAMP ACTUATING STRUCTURE

This invention is directed to actuating means for flash lamps of the type requiring an impact for their operation. The invention is particularly directed to a camera construction which includes the flash lamp actuating means while also employing the mechanical movements occurring during flash lamp operation for purposes of achieving film exposure. In this manner, the flash lamp operation and film exposure can be properly synchronized.

Flash lamps of the so-called percussion type have recently been introduced and are expected to become quite popular. Although the concepts of percussion lamps are applicable to individual bulbs, the commercial structures comprise flash cubes containing four bulbs such as the "Magicube" marketed by Sylvania Electric.

In cameras employing flash cubes, a flash lamp socket is provided for locating the flash cubes in a suitable position on the camera housing. The socket may be tied to the shutter operating means of the camera or to film advancing means of the camera whereby the socket will automatically rotate to position a fresh bulb each time an unexposed film frame is moved to picture taking position. Reference is made to applicant's copending applications Ser. No. 816,951, filed on April 17, 1969 and Ser. No. 864,375 filed on Oct. 7, 1969. As noted in these applications, the camera constructions may have mechanisms for automatically or manually positioning the flash cubes.

As shown in these pending applications, the cameras employ electrically operated flash bulbs with batteries being employed to achieve the flashing operation. Spaced apart electrical contacts are included within the camera housing, and the flash is synchronized with the film exposure by bridging these contacts with a movable plate driven by the shutter actuating mechanisms. In the case of percussion type bulbs, a greater problem exists since a certain amount of mechanical energy is required for releasing the impact finger of the flash lamps. From an efficiency standpoint, it is, of course, also desirable to achieve an operating system which depends on shutter actuation, and which is compatible with existing camera constructions so that several changes in camera design are not required.

In applicant's copending application Ser. No. 54,544, there are described flash bulb operating mechanisms for percussion type flash bulbs. It is the general object of this invention to provide an alternative and improved system for achieving operation of these flash bulbs, while retaining the advantages of the previously disclosed systems.

It is a more specific object of this invention to provide mechanisms for achieving the actuation of percussion type flash bulbs which provide a relatively simple means for achieving efficient mechanical energy and operating synchronization whereby the percussion type bulbs can be efficiently incorporated into cameras of an otherwise standard design.

These and other objects of this invention will appear hereinafter and for purposes of illustration, but not of limitation, specific embodiments of the invention are shown in the accompanying drawings in which:

FIG. 6 is a vertical, sectional view of the camera construction taken about the line 6—6 of FIG. 1 and illustrating the operating components in the normal state prior to shutter actuation;

FIG. 7 is a cross-sectional view illustrating the operating components in the position of film exposure and flash cube actuation;

FIG. 8 is an exploded perspective view of the push bar and push bar actuator employed for flash cube actuation;

FIG. 9 is an enlarged fragmentary sectional view taken about the line 9—9 of FIG. 6;

FIG. 10 is a horizontal sectional view of the camera construction illustrating the push bar structure in relationship to the flash cube socket;

FIG. 11 is a horizontal, sectional view of the camera construction illustrating the flash cube socket and push bar from a bottom view position; and, FIG. 12 is a fragmentary view illustrating the mechanism employed for winding the actuating spring for the pusher rod structure.

This invention generally relates to a flash lamp actuating structure associated with a camera construction of the type including a housing for holding a length of film. Means are provided for advancing the film to locate successive frames in picture taking position. A shutter mechanism is employed for exposing the successive frames and this mechanism is also utilized for operating the flash bulb. The invention is particularly concerned with flash bulbs of the type having a spring loaded firing finger adapted to be moved beyond a restraining member and then into impact engagement with the stem of a flash bulb. In bulbs of the percussion type, this impact will result in firing of the bulb.

The specific improvements of the invention relate to an improved structure including a pusher rod for moving the firing finger beyond its restraining means to achieve the desired impact. The pusher rod is connected to a driving means, and this driving means is in turn connected to a spring. During shutter operation, the spring is wound while the pusher rod is retained against movement. At an intermediate stage in the shutter actuation, the retaining means for the pusher rod is removed, and this releases the rod whereby the rod will move rapidly in response to unwinding of the spring. The rod end is then brought into engagement with the firing finger of the flash bulb for achieving the desired flash of light. The pusher rod also finds means engaging the shutter plate for the camera. Accordingly, when the pusher rod is moved for achieving bulb firing, the rod also serves to drive the shutter plate whereby an opening of the shutter plate will register with the lens opening to thereby achieve film exposure.

Figure 1:
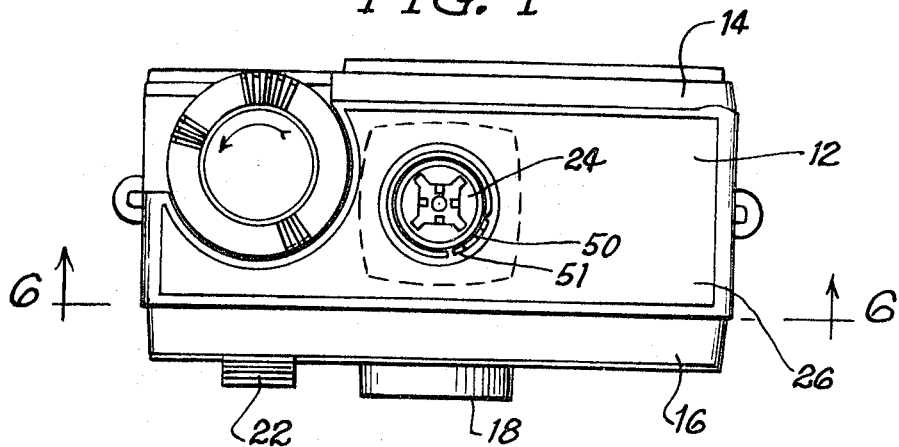
FIG. 1 is a plan view of a camera construction of the type suitable for incorporation of the features of this invention.
Figure 2:
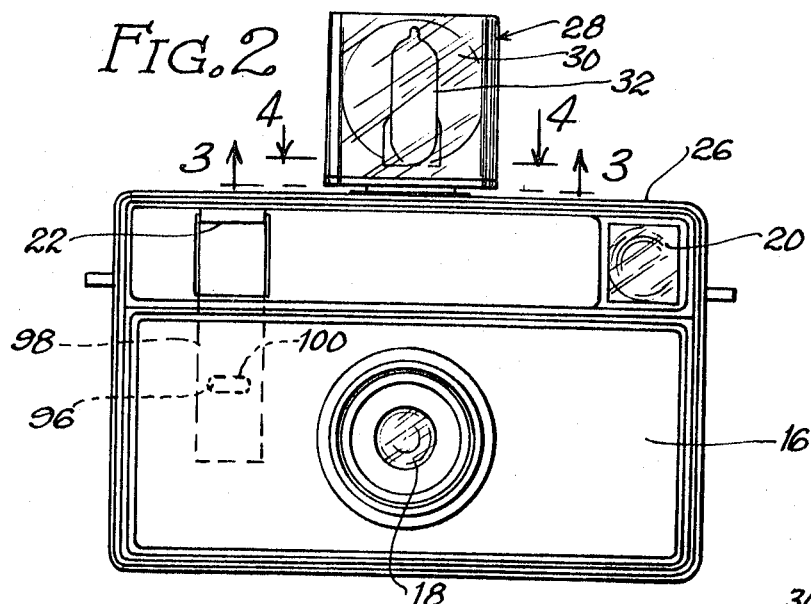
FIG. 2 is an elevational view of the construction shown in FIG. 1.
Figure 3:
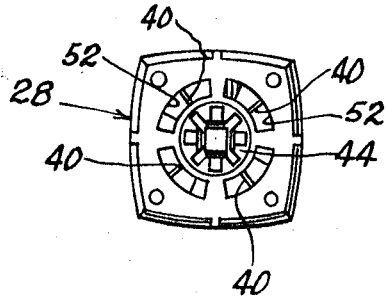
FIG. 3 is a bottom plan view of a percussion type flash cube taken about the line 3—3 of FIG. 2.
Figure 4:
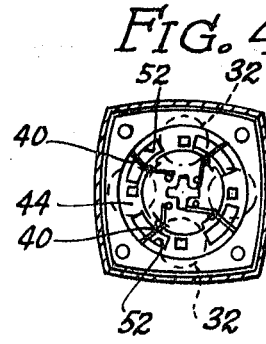
FIG. 4 is a cross-sectional view of a flash cube taken about the line 4—4 of FIG. 2.
Figure 5:
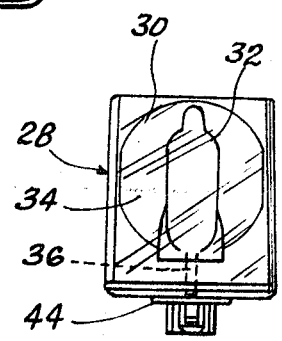
FIG. 5 is an elevational view of a flash cube.

FIG. 1 illustrates a camera construction 10 which is designed to incorporate the flash bulb actuating mechanisms of this invention. This construction comprises a housing 12 having a removable back wall 14. This removable wall provides access to the interior of the camera for insertion and removal of film.

The camera housing also defines a front wall 16 having a centrally located lens opening 18. A viewing window 20 is located in one corner of the front wall, and a shutter actuating button 22 is located in the corner opposite the viewing window.

A flash cube holding socket 24 is positioned on the top wall 26 of the housing. As best illustrated in FIGS. 2, 3, 4 and 5, a flash cube 28 is adapted to be located in this socket. The flash cube 28 comprises a transparent outer shell 30, and four bulbs 32 are located within this shell. A reflector surface 34 which may be formed by a highly reflective foil material is positioned behind each bulb.

Each of the bulbs 32 includes a downwardly extending stem 36. In percussion type bulbs, when this stem is subjected to impact, there will be a suitable flash of light. The impact is preferably achieved by means of an impact spring finger structure 38 best illustrated in FIGS. 4 and 8. This impact spring structure is mounted so that the finger 40 thereof is normally urged toward the stem 36. A plurality of detents 42 are secured to the annular base portion 44 of the flash cube, and these detents are employed for retaining the impact or firing fingers 40 in spaced relationship relative to the stems 36 of the four bulbs mounted in the flash cube. The fingers 40 are spring loaded in this condition and, therefore, they will accelerate rapidly toward the stems 36 when the restraining influence is removed.

The spring fingers 40 are operated by means of a pusher rod structure 46. This structure includes an upper engaging portion 48 having a narrow end 50 which is receivable within each of the openings 52 defined by the annular portion 44 of the flash cube base. The fingers 40 extend across the openings 52 and are, therefore, engageable by the end 50 of the pusher rod. This action forces the fingers upwardly away from the restraining influence of the detent 42 and into contact with the stem 36 of an adjacent flash bulb. As is best shown in FIGS. 1, 10 and 11, the bulb socket 24 defines a slotted area 51 which receives the push rod portion 48 and the narrow end 50 thereof. This opening 51 will be in direct alignment with each opening 52 defined by the bulb as the respective openings are moved into position by the bulb advancing structure.

The pusher rod structure includes a lower section 56 defining an end portion 58 which extends at right angles, and which is received within a slot 60 defined by the outwardly extending tab 62 in the pusher rod member 48. It will be appreciated that this interlocking of the pusher rod members 48 and 56 results in vertical movement of the parts in unison.

The pusher rod section 56 defines an opening 64 which receives the end 66 of a rocker element 70. This rocker element is mounted on an enlarged trunion 72 located on the back side of the intermediate wall 74 of the camera, this attachment permitting pivotal movement of the rocker. The rocker also defines an arm 76 carrying a pin 78 which extends through an arcuate slot 80 defined by the wall 74.

Mounted on the front side of the wall 74 is a plate 90. The plate is pivotally movable about the axis 92, and the plate defines an arm 94 and pin 96 which operate in the manner described in the aforementioned copending applications. Specifically, a vertically extending bar 98 (FIG. 2) defines a slot 100 which receives the pin 96. This bar is formed integrally with the shutter button 22, and depression of the shutter button, therefore, results in pivoting of the plate 90.

The wall 74 defines an enlarged opening 102, and an inturned portion 104 of the plate 90 extends through this opening. A spring engaging element 106 is secured to this portion 104 for pivotal movement with the plate 90 between the limits shown in FIGS. 6 and 7. The element 106 defines a bifurcated end 108 which receives the end 110 of the spring member 112. This spring member extends around a post 114 with the other end 116 of the spring member being connected to the pin 78 carried by the rocker 70.

The member 56 of the push rod structure defines a first outwardly extending tab 118 which extends through a slot 120 defined by the wall 74. A pivotally mounted retaining element 122 defines a foot 124 which normally engages the tab 118. Accordingly, when the restraining element is in the position shown in FIG. 6, the push bar is restrained against vertical movement. During an initial stage of shutter actuation, therefore, the end 110 of the spring 112 is wound by the pivoting movement of the plate 90 while the end 116 of the spring is held stationary. Thus, the push bar prevents any movement of the rocker 70 during this initial stage of shutter operation.

As the pivoting action of the plate 90 continues, the bearing element 126 of this plate eventually engages the bearing surface 128 defined by the retaining element 122. This causes pivoting of the retaining element in opposition to the action of spring 130. This pivoting action moves the foot 124 out of engagement with the tab 118 therefore freeing the push bar and associated rocker.

In addition to engaging the firing finger of a flash bulb during upward movement, the push bar also operates to pivot the shutter plate 132 for achieving film exposure. This shutter plate is pivotally connected to the wall 74 at 134 and is normally held in the position shown in FIG. 6 by means of spring 136. One end of this spring is held by a tab 138 formed in the wall 74 while the other end is held by means of a tab 140 formed in the plate 132. A foot 142 is formed in the plate 132, and this foot is located in the path of a second outwardly extending tab 144 formed in the push rod member 56. Accordingly, when the push rod is released by the retaining element 122 and is driven upwardly by the action of rocker 70 and spring 112, the tab 144 will engage the foot 142 and thereby pivot the plate 132 in opposition to the spring 136. The pivoting movement of the plate 132 exposes the lens opening 146 which is normally blocked by this plate.

The spring 112 is a relatively heavy spring and, therefore, there is a rapid and relatively high application of force applied by the push bar structure. Accordingly, the shutter plate 132 moves at a high rate, and for that reason, a barrier 148 is formed in the wall 74. The shutter plate carries a tab member 150 which has a similar shape and which is located so that it will be received by the barrier element 148 each time the shutter plate is moved to the open position. The element 148 and tap 150 are dimensioned so that there will be a slight squeezing affect whereby a dampening of the impact will occur.

The movement of the push bar is sufficient so that the tab 144 will move completely by the foot 142 of the shutter plate. When this occurs, the spring 136 will operate to swing the shutter plate back to the blocking position. Accordingly, the shutter plate will be out of locking position only during the interval of movement of the tab 144 from the engaging position of the shutter plate to a position beyond the shutter plate. Obviously, this will result in a very brief exposure of the film, and there is no difficulty in obtaining an exposure for the desired interval of about 20 milliseconds. Since a typical flash bulb will reach peak lighting condition in about 7 milliseconds, the arrangement of this invention insures that the peak lighting will occur during the period of film exposure. Thus, the arrangement of this invention wherein both the flash bulb actuating and film exposure are dependent on the movement of the push bar, provides an ideal means for synchronizing these operations.

The flash bulb actuating mechanisms may be incorporated in a camera of the type utilizing film cartridges. As explained in the aforementioned applications, such cartridges comprise lengths of film having apertures at spaced intervals with the apertures being used for determining the location of the respective film frames. Cameras have been devised which utilize a finger adapted to ride in engagement with the film surface during advancing of the film and to then detect the presence of an aperture with continued movement of the film moving the finger whereby locking of the film advancing wheel will occur. The subsequent taking of a picture results in withdrawing the sensing finger from a film aperture whereby the finger will be positioned for riding on the film surface during the next film advancing step and whereby the next aperture can be detected.

As discussed in the aforementioned applications, automatic control of the flash cube socket can also be accomplished by the shutter operating mechanisms which control the sensing finger. For this reason, the plate 90 is provided with a foot 152 which engages the arm 154 of a pivotally mounted element 156. The element 156 includes an upstanding arm 158 which serves to impart flash cube advancing action.

The plate 90 also defines an extension 160 which is normally blocked by a finger 162. This blocking action is effected at the conclusion of a shutter actuation cycle and is maintained until the film has been advanced to the next frame at which time the movement of the sensing finger into an aperture will move the finger 162 out of blocking position thereby freeing the plate for movement in response to depression of the shutter button 22.

The downward movement of the shutter button moves the plate 90 in opposition to the spring 164. Accordingly, when the shutter button is released, the plate 90 will automatically be restored to its original position. The push rod is restored by the action of the spring 166 which has one end connected to the hole 168 defined by the push rod member 56 and the other end attached to a post 170 extending rearwardly from the wall 74. The spring 112 is preferably designed so that it will be substantially completely free of load in the positions shown in FIGS. 6 and 7. Thus, the load imparted to the spring during the initial stage of shutter actuation is substantially completely released when the push rod is moved upwardly by the rocker.

Accordingly, the force imparted by the spring 166 is the only force required for restoring the rocker 70 and spring 112 to the position shown in FIG. 6.

Since the shutter plate 132 must close independently of the push rod structure (for example if the user of the camera maintains pressure on the button 22) the tab 144 is provided with a cam surface 172 which permits movement of this tab below the foot 142 during restoring of the push rod. The movement required for this restoring action can be accomplished by providing some freedom of movement for the push rod member 56, and for then providing a slight bias for the push rod toward the wall 74 which can be efficiently accomplished by means of the spring 166.

It will be understood that various changes and modifications may be made in the above described construction which provide the characteristics of this invention without departing from the spirit thereof particularly as defined in the following claims.

That which is claimed is:

1. In a camera construction including a housing for holding shutter means including a blocking member normally covering a lens opening, a shutter actuating means operable by the user of the camera for causing movement of the blocking member out of covering position for exposing film held in the camera, and a flash lamp socket mounted on the top wall of the camera and designed to hold at least one flash bulb, said bulb having a spring loaded firing finger adapted to be moved beyond a restraining member and to then engage firing means for the bulb, the improvement comprising means including a pusher rod for moving said finger beyond its restraining member, said rod being positioned for vertical reciprocating movement relative to the bulb, means defined by said rod for engaging said blocking member to thereby move the blocking member from its normal covering position, rod driving means comprising a rocker member engaging the rod and movable in a plane extending parallel with the front wall of the camera, spring means connected between said shutter actuating means and said rod driving means, retaining means for holding said rod against movement during an initial stage of shutter actuation during which said shutter actuating means is moved in opposition to the action of said spring means, continued movement of said shutter actuating means operating to disengage said rod from said retaining means whereby said driving means operates to rapidly move said rod in response to the action of said spring means, and whereby said rod operates to move said finger beyond said restraining means substantially simultaneously with the movement of the blocking member by the rod whereby peak bulb lighting will occur during exposure of a film frame.

2. A construction in accordance with claim 1 wherein said shutter actuating means includes a pivotally mounted plate located in a plane extending parallel with the plane containing the rocker member, and including a shutter button exposed on the exterior of the camera for imparting pivotal movement to said plate.

3. A construction in accordance with claim 2 wherein said spring means has one end engaging said plate and the other end engaging said rocker member, said spring means being substantially free of applied force in the state of the camera prior to the initiation of shutter actuation, and wherein the force applied to the spring means during shutter actuation is substantially completely removed upon disengagement of the rod from said retaining means.

4. A construction in accordance with claim 3 including a separate spring member connected to said rod, said rod being moved in opposition to said separate spring member when the rod is moved to achieve flash bulb firing and film exposure, said separate spring member operating to restore the rod to its original position, and wherein said rocker means follows the rod during restoring movement for thereby repositioning the rocker means.

5. A construction in accordance with claim 4 including an additional spring member associated with said plate, said plate being pivotable in opposition to said additional spring member, said additional spring member operating to restore the plate to its original position upon release of the shutter actuating force.

6. A construction in accordance with claim 4 wherein said blocking member comprises a second pivotally mounted plate, an additional spring associated with said blocking member with the movement of the blocked member imparted by said rod occurring in opposition to the force of said additional spring, and wherein said additional spring restores the blocking member to its lens blocking position independently of the return movement of said rod.

7. A construction in accordance with claim 1 wherein said rod is formed of upper and lower parts with the upper part being movable in a vertical plane offset from the vertical plane of movement of the lower part, and means interconnecting the upper and lower parts whereby driving movement imparted to the lower part will be transferred to the upper part.

8. A construction in accordance with claim 1 wherein said rod defines a gap along its length, said rocker including a first arm extending into said gap whereby movement of the rocker can be transmitted to said rod.

9. A construction in accordance with claim 1 wherein said rod includes first and second outwardly extending tabs, said retaining means normally engaging one of said tabs, said blocking means including a portion normally located in vertically spaced relation relative to the other tab, and wherein disengagement of said one tab with said retaining means results in driving of the other tab into engagement with said locking member to achieve film exposure.

10. A construction in accordance with claim 9 wherein said retaining means comprises an additional pivotally mounted plate, spring means normally holding said plate in position for engaging said one tab of said rod, and means defined by said additional plate for engagement with said shutter actuating means, the engagement with said shutter actuating means occurring upon said continued movement of the shutter actuating means whereby said retaining means is pivoted in opposition to said additional spring, said additional spring operating to return said retaining means to its original position upon removal of the engagement by the shutter actuating means.

11. In a camera construction including a housing for holding shutter means including a blocking member normally covering a lens opening, a shutter actuating means operable by the user of the camera for causing movement of the blocking member out of covering position for exposing film held in the camera, and a flash lamp socket designed to hold at least one flash bulb, said bulb having a spring loaded firing finger adapted to be moved beyond a restraining member and to then engage firing means for the bulb, the improvement comprising a pusher rod defining first means for moving said finger beyond its restraining member, second means defined by said rod for engaging said blocking member to thereby move the blocking member from its normal covering position, rod driving means, spring means connected between said shutter actuating means and said rod driving means, retaining means for holding said rod against movement during an initial stage of shutter actuation during which said shutter actuating means is moved in opposition to the action of said spring means thereby building up forces in said spring means, means operatively associated with said shutter actuating means for contacting said retaining means whereby continued movement of said shutter actuating means operates to disengage said rod from said retaining means whereby said driving means operates to rapidly move said rod in response to the release of said forces in said spring means, and whereby said rod operates to move said finger beyond said restraining means and to substantially simultaneously move said blocking member whereby peak bulb lighting will occur during exposure of a film frame.

* * * * *